(12) United States Patent  (10) Patent No.: US 7,689,402 B2
Naylor  (45) Date of Patent: Mar. 30, 2010

(54) METHOD AND APPARATUS FOR RETRIEVING APPLICATION-SPECIFIC CODE USING MEMORY ACCESS CAPABILITIES OF A HOST PROCESSOR

(75) Inventor: Rowan Nigel Naylor, Basingstoke (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 642 days.

(21) Appl. No.: 11/560,878

(22) Filed: Nov. 17, 2006

(65) Prior Publication Data

US 2008/0120491 A1 May 22, 2008

(51) Int. Cl.
G06F 9/44 (2006.01)
G06F 9/38 (2006.01)
G06F 13/00 (2006.01)

(52) U.S. Cl. .............. 703/22; 703/23; 703/24; 703/27; 713/161; 710/64; 712/220

(58) Field of Classification Search .................. 703/23, 703/24, 22, 27; 707/100; 713/161; 710/64; 712/220
See application file for complete search history.

(56) References Cited

U.S. PATENT DOCUMENTS

| | | | |
|---|---|---|---|
| 4,799,150 A | 1/1989 | Bui | |
| 5,485,624 A | 1/1996 | Steinmetz et al. | |
| 5,515,519 A | 5/1996 | Yoshioka et al. | |
| 5,619,408 A | 4/1997 | Black et al. | |
| 5,717,587 A | 2/1998 | Black et al. | |
| 5,852,729 A | 12/1998 | Limberis et al. | |

(Continued)

FOREIGN PATENT DOCUMENTS

EP 1241567 9/2002

(Continued)

OTHER PUBLICATIONS

Cooper, "Porting the Vector Pascal Compiler to the Playstation 2," http://www.dcs.gla.ac.uk/{wpc/reports/compilers/compilerindex/PS2.pdf>, pp. 14-15, 20, 27, Retrieved on Feb. 5, 2007, XP-002418618.

*Primary Examiner*—Thai Phan
(74) *Attorney, Agent, or Firm*—Coats & Bennett, P.L.L.C.

(57) ABSTRACT

The memory access capabilities of a host processor are used to facilitate the movement of instructions and data to an application-specific component having direct access to memory. Although the component executes code absent direct host processor control, the code may be uniquely tailored to the component's architecture. According to one embodiment, a flow of instructions requested by a host processor from a memory device is monitored. The flow of instructions is routed to an application-specific component in response to identifying code embedded in the flow of instructions targeted for execution by the component. While the instruction flow is routed to the component, a sequence of instructions is directed to the host processor that maintains instruction execution flow in the host processor, e.g., no-op instructions. When the end of the application-specific code is detected, the instruction flow is re-routed to the host processor for execution.

71 Claims, 8 Drawing Sheets

U.S. PATENT DOCUMENTS

| | | |
|---|---|---|
| 6,877,087 B1 | 4/2005 | Yamada et al. |
| 6,976,151 B1 | 12/2005 | Overkamp et al. |
| 7,200,599 B2 * | 4/2007 | Simon et al. ............... 707/100 |
| 7,356,456 B1 * | 4/2008 | Wheeler ..................... 703/23 |
| 2001/0032305 A1 | 10/2001 | Barry |
| 2001/0037441 A1 | 11/2001 | Rosin et al. |
| 2003/0037236 A1 * | 2/2003 | Simon et al. ............... 713/161 |
| 2005/0169086 A1 | 8/2005 | Yamada et al. |
| 2006/0015855 A1 | 1/2006 | Kumamoto |

FOREIGN PATENT DOCUMENTS

| | | |
|---|---|---|
| WO | WO 97/35252 | 9/1997 |
| WO | WO 99/26134 | 5/1999 |

* cited by examiner

METHOD AND APPARATUS FOR RETRIEVING APPLICATION-SPECIFIC CODE USING MEMORY ACCESS CAPABILITIES OF A HOST PROCESSOR

BACKGROUND

The present invention generally relates to off-loading tasks in an electronic system, and particularly relates to managing the flow of information between an application-specific component and other components using the memory access capabilities of a host processor.

Conventional electronic systems comprise various components, each component having a defined role within the system. For example, one or more host processors such as a General Purpose Processor (GPP) or a Central Processing Unit (CPU) controls overall system operation, e.g., by executing code and managing the flow of information within the system. Other components included in the system perform specific tasks, e.g., memory management, Input/Output (I/O) management, peripheral management, and limited or specialized data processing tasks.

Ever increasing performance demands create various bottlenecks within conventional systems. For example, memory and I/O interface bottlenecks hinder system performance. In addition, increased processing demands placed on a host processor further limit system efficiency since the host processor is tasked not only with executing performance-intensive code, but also with overseeing overall system operation such as I/O and memory management.

Special-purpose CPUs, e.g., a Digital Signal Processor may alleviate some processing demands placed on a host processor by handling certain types of tasks. Special-purpose CPUs are conventionally loosely coupled to a host processor in that they communicate with a host processor via a separate interface and have their own memory to which only they have direct access. Since a special-purpose CPU is loosely coupled to a host processor and has direct access to its own memory, it does not require direct control by the host processor to function. Instead, a special-purpose CPU is capable of independently accessing memory, fetching instructions, and executing code. Because special-purpose CPUs operate independently from a host processor, complex hardware and software is included in special-purpose CPUs for managing memory access.

A co-processor is yet another option for off-loading processing tasks assigned to a host processor, thereby allowing the host processor to utilize its processing resources for other tasks. Co-processors are designed for specific applications such as floating point arithmetic, graphics processing, broadband signal processing, encryption/decryption, etc. A co-processor is conventionally tightly coupled to a host processor in that the co-processor shares a single main memory with the host processor and operates under direction of the host processor. In addition, conventional co-processors execute instructions that are compliant with the instruction set architecture associated with the host processor. Unlike a special-purpose CPU, a co-processor is dependent upon a host processor for overseeing its operation since the co-processor does not have direct access to its own dedicated memory nor instruction fetch capability. Further, a co-processor is conventionally collocated with a host processor, and thus cannot be loosely coupled to the host processor, but instead operates under direct control of the host processor. As such, co-processors are conventionally dependant upon a host processor for fetching instructions, controlling co-processor instruction execution and handling all other operations aside from co-processor functions.

SUMMARY

According to the methods and apparatus taught herein, the memory access capabilities of a host processor are used to facilitate the movement of instructions and data to an application-specific component having direct access to memory. This allows loose coupling of the application-specific component to the host processor without requiring the component to have memory management circuitry. With such an arrangement, the host processor may offload processing tasks to the application-specific component for handling. Code executed by the application-specific component may be incompatible with the instruction set architecture of the host processor. That is, the code may be uniquely tailored to the architecture of the application-specific component. In addition, the application-specific component executes code absent direct host processor control. The component relies on the host processor only for memory management tasks, not for processing control.

According to one embodiment, information flow to an application-specific component is managed using the memory access capability of a host processor. A flow of instructions requested by the host processor from a memory device is monitored. The flow of instructions is routed to the application-specific component in response to identifying code embedded in the flow of instructions targeted for execution by the application-specific component. In one embodiment, the code is identified when a reserved host processor instruction signaling the beginning of the code is detected in the flow of instructions. In another embodiment, a particular memory address from which the host processor has requested instruction retrieval indicates the beginning of the code.

While the flow of instructions is being routed to the application-specific component, a sequence of instructions is directed to the host processor that maintains instruction execution flow in the host processor, e.g., no-op instructions. As such, instruction retrieval from the memory device continues. When the end of the code is detected, the flow of instructions is re-routed to the host processor for execution. As such, code targeted for execution by an application-specific device may be integrated with code to be executed by the host processor. The memory access capabilities of the host processor may also be used to facilitate the movement of data between the application-specific component and other components.

According to one embodiment of an apparatus for managing information flow to an application-specific component using the memory access capability of a host processor, the apparatus comprises an instruction filter and a control unit. The instruction filter is configured to monitor a flow of instructions requested by a host processor from a memory device. The filter identifies code embedded in the flow of instructions targeted for execution by the application-specific component and directs a sequence of instructions to the host processor while the flow of instructions is being routed to the application-specific component. The sequence of instructions directed to the host processor maintains instruction execution flow in the host processor. When the filter identifies an end of the code, it re-routes the flow of instructions to the host processor. The control unit is configured to route the flow of instructions to the application-specific component when the instruction filter identifies the code. As such, the apparatus forms an interface between the host processor and the application-specific component. The apparatus leverages the memory access capabilities of the host processor to route instructions and data between the application-specific component and other components, e.g., the host processor and/or memory.

According to one embodiment of an electronic system, the system comprises an application-specific component and a flow control component. The application-specific component is loosely coupled to a host processor having memory access capability. The application-specific component is configured to execute code stored in a memory device. The flow control component is configured to direct the code to the application-specific component for execution using the memory access capability of the host processor. In addition, the flow control component may use the memory access capability of the host processor to route data between the application-specific components and other devices.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
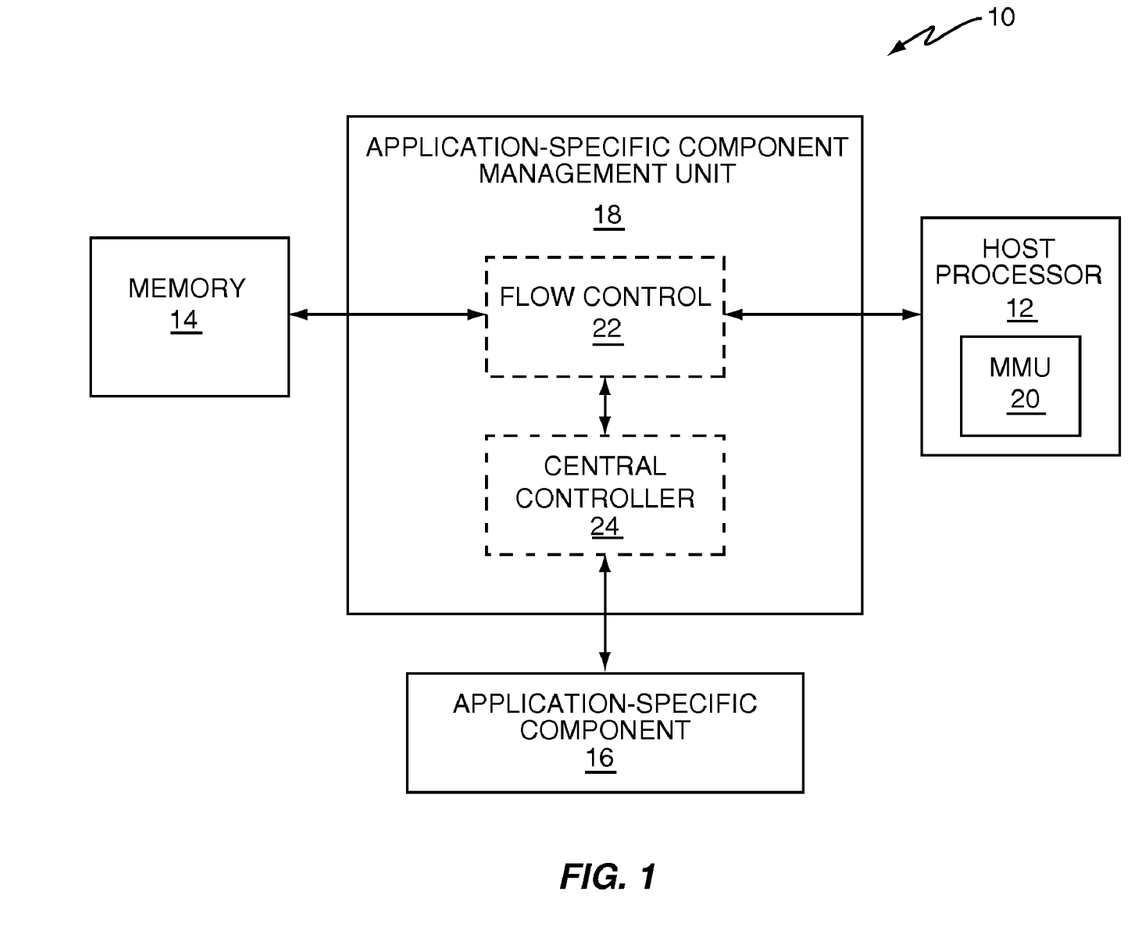
FIG. 1 is a block diagram of one embodiment of a system including a host processor, a memory device, an application-specific component, and a unit for managing the application-specific component.

FIG. 1 illustrates an electronic system 10 having a host processor 12, a memory device 14, an application-specific component 16, and a unit 18 for controlling the flow of instructions and data to and from the application-specific component 16. The host processor 12 controls overall system 10 operation including memory management tasks. The host processor 12 may be a General Purpose Processor (GPP), a Central Processing Unit (CPU) or a special-purpose processor such as a Digital Signal Processor (DSP). Regardless, the memory device 14 stores code targeted for execution by either the host processor 12 or the application-specific component 16. The application-specific component 16 executes code associated with one or more particular processing tasks supported by the application-specific component 16. As such, certain tasks may be offloaded from the host processor 12 to the application-specific component 16 for handling.

Program code targeted for execution by the application-specific component 16 is retrieved from the memory device 14 using the memory access capabilities of the host processor 12, e.g., as provided by a conventional Memory Management Unit (MMU) 20. As such, the application-specific component 16 does not need its own dedicated memory management circuitry for retrieving code. Instead, the application-specific component 16 relies on the host processor 12 for accessing the memory device 14. The memory management capabilities of the host processor 12 are also used to facilitate the movement of data within the system 10. To that end, the Application-Specific Component (ASC) management unit 18 resides in-line with the instruction and data paths of the host processor 12, thus enabling it to monitor and alter the flow of instructions and data within the system 10 using the memory management capabilities of the host processor 12.

The ASC management unit 18 passively monitors instructions being retrieved from the memory device 14 at the request of the host processor 12. In doing so, the ASC management unit 18 is able to identify code targeted for execution by the application-specific component 16. If no such code is identified, the ASC management unit 18 passes the retrieved instructions to the host processor 12, thus enabling normal instruction flow between the host processor 12 and the memory device 14. However, if the ASC management unit 18 detects code targeted for execution by the application-specific component 16, it routes the flow of instructions to the application-specific component 16 instead of the host processor 12. This allows the application-specific component 16 to execute code designed for it absent direct control from the host processor 12.

While the flow of instructions is being routed to the application-specific component 16 for execution, the ASC management unit 18 directs instructions to the host processor 12 designed to maintain instruction execution flow within the host processor 12. In response, the host processor 12 continues to execute instructions, just not the ones being retrieved from the memory device 14. The instructions directed to the host processor 12 may be any instruction suitable for maintaining host processor 12 instruction execution without disturbing it, e.g., no-op instructions or instructions that move data between processor registers (not shown).

By ensuring that instruction execution flow is maintained within the host processor 12, code retrieval from the memory device 14 continues until the code has been retrieved in its entirety and routed to the application-specific component 16. If the host processor 12 is idled or otherwise ceases requesting instructions, instruction retrieval from the memory device 14 would stop and the application-specific component 16 would subsequently stall. Thus, the process of directing instructions to the host processor 12 for maintaining instruction execution flow continues until application-specific code has been fully retrieved from the memory device 14. When the ASC management unit 18 detects an end to the code, it re-routes the flow of instructions being retrieved from the memory device 14 back to the host processor 12 for execution. As such, the ASC management unit 18 ensures that code retrieved from the memory device 14 is executed by the proper entity.

In more detail, a flow control unit 22 included in or associated with the ASC management unit 18 monitors instructions flowing from the memory device 14 to the host processor 12. When enabled, the flow control unit 22 begins monitoring instructions retrieved from the memory device 14 at the request of the host processor 12, as illustrated by Step 100 of FIG. 2. The flow control unit 22 monitors the flow of instructions, looking for the beginning of code targeted for execution by the application-specific component 16, as illustrated by Step 102 of FIG. 2. If the flow control unit 22 recognizes the beginning of application-specific code, it causes the instruction flow to be routed to the application-specific component 16, as illustrated by Step 104 of FIG. 2. In one embodiment, a central controller 24 included in or associated with the ASC management unit 18 controls information flow between the ASC management unit 18 and the application-specific component 16, including the routing of instructions and data to the component 16. When the flow of instructions is routed to the application-specific component 16, the flow control unit 22 directs a sequence of instructions to the host processor 12 that maintains instruction execution flow in the host processor 12, as illustrated by Step 106 of FIG. 2. This ensures ongoing retrieval of the code from the memory device 14.

Figure 2:
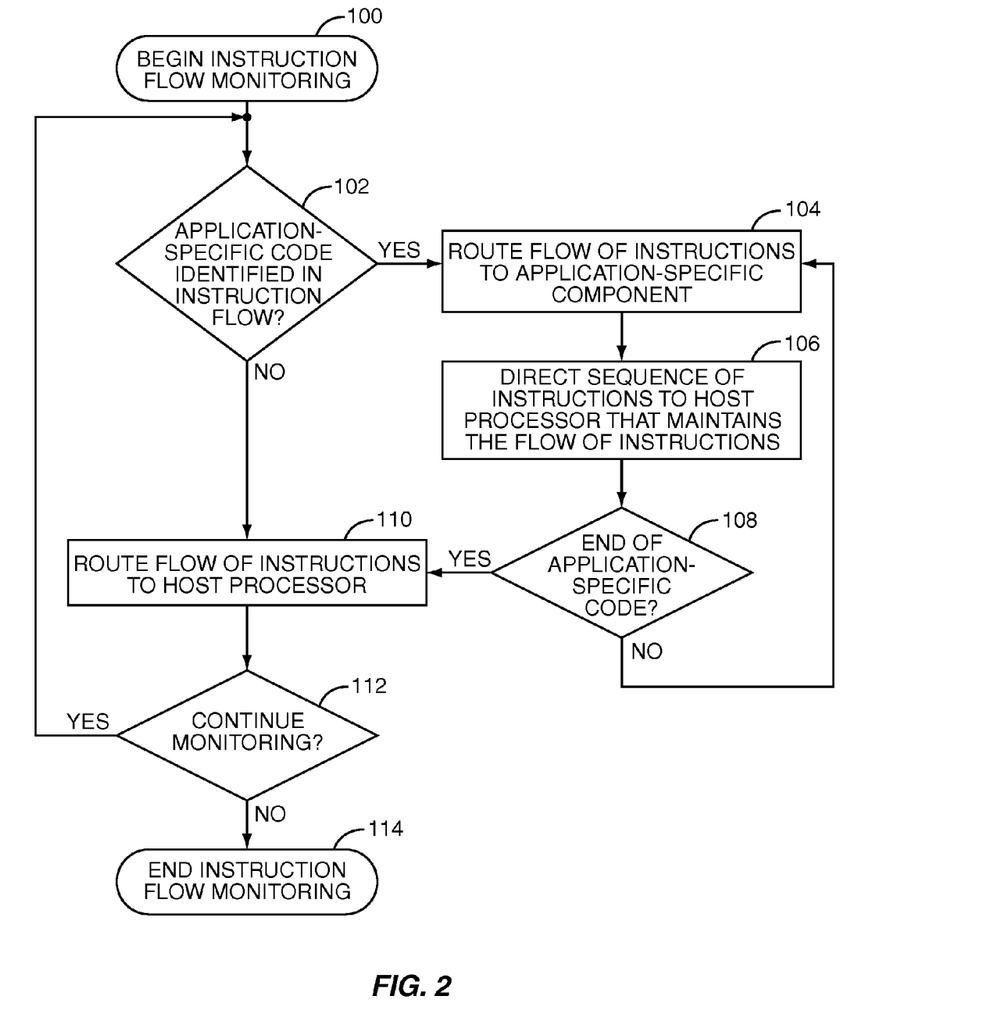
FIG. 2 illustrates one embodiment of processing logic for using the memory access capabilities of a host processor to provide code to an application-specific component.

The ASC management unit 18 continues to route the instructions to the application-specific component 16 until the flow control unit 22 detects an end of the code sequence, as illustrated by Step 108 of FIG. 2. When the end of the code is detected, the flow control unit 22 causes the flow of instructions to be re-routed to the host processor 12, as illustrated by Step 110 of FIG. 2. As such, instructions retrieved from the memory device 14 after the end of the code are directed to the host processor 12 for execution. The flow control unit 22 also causes the flow of instructions to be routed to the host processor 12 so long as no application-specific code is detected (Step 110).

The flow control unit 22 continues to monitor instructions retrieved from the memory device 14 for additional sequences of code targeted for execution by the application-specific component 16, as illustrated by Step 112 of FIG. 2. The flow control unit 22 continues instruction flow monitoring unless instructed otherwise or disabled, as illustrated by Step 114 of FIG. 2. The ASC management unit 18 thus functions like a router in that it directs instructions retrieved from the memory device 14 at the request of the host processor 12 to the appropriate entity for execution.

Figure 3:
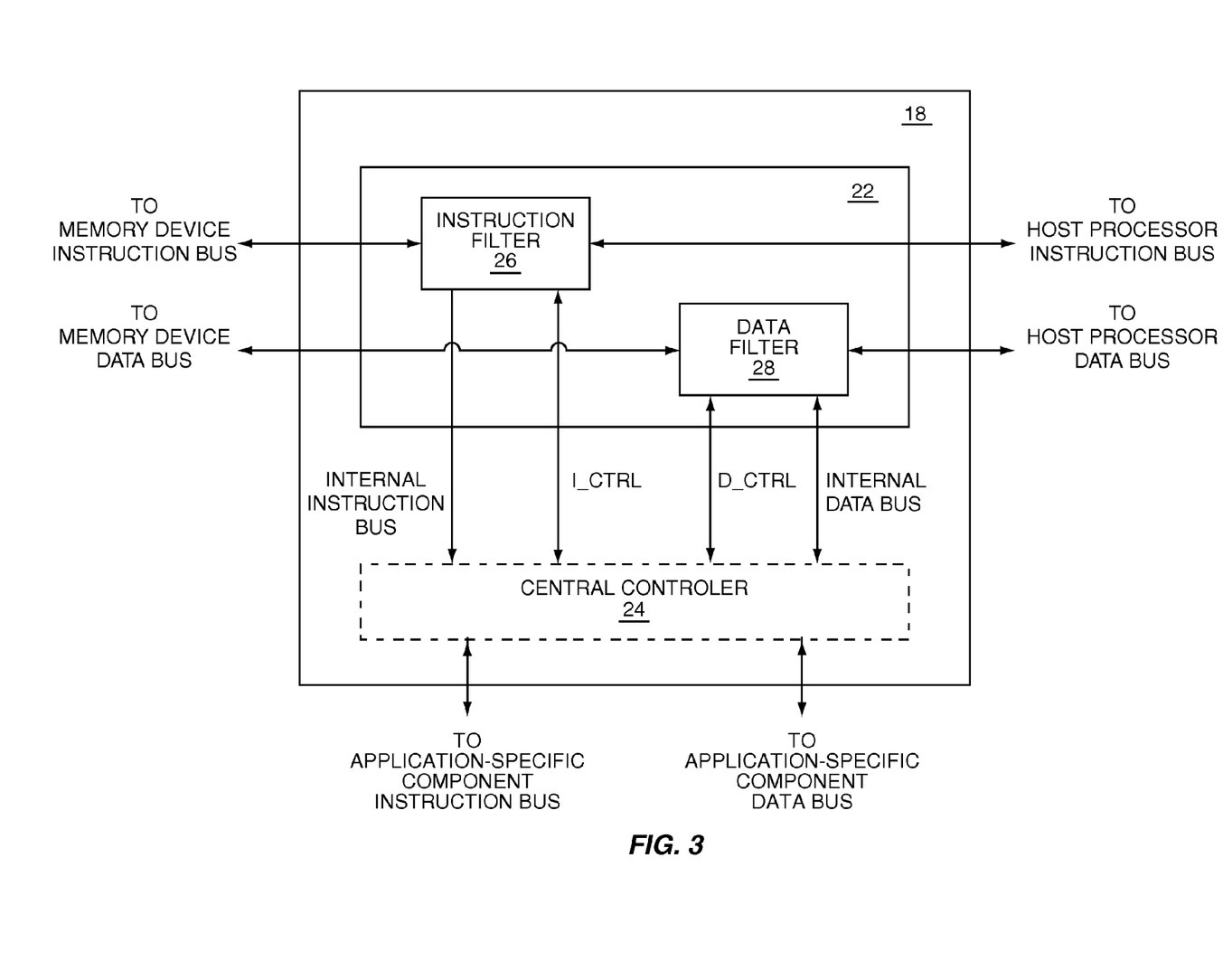
FIG. 3 is a block diagram of one embodiment of an application-specific component management unit.

FIG. 3 illustrates one embodiment of the ASC management unit 18. According to this embodiment, the flow control unit 22 comprises an instruction filter 26 and a data filter 28. The central controller 24 and the filters 26, 28 communicate via various signals (I_CTRL and D_CTRL) to maintain proper operation, as will be discussed in detail later. In addition to instruction routing, the data filter 28 allows the ASC management unit 18 to route data flows as will be described in detail later. The instruction filter 26 monitors instructions retrieved from the memory device 14, looking for code targeted for execution by the application-specific component 16. If application-specific code is identified, the central controller 24 routes the instructions associated with the code to the application-specific component 16 while the instruction filter 26 directs instructions to the host processor 12 for maintaining host processor 12 instruction execution flow.

Figure 4:
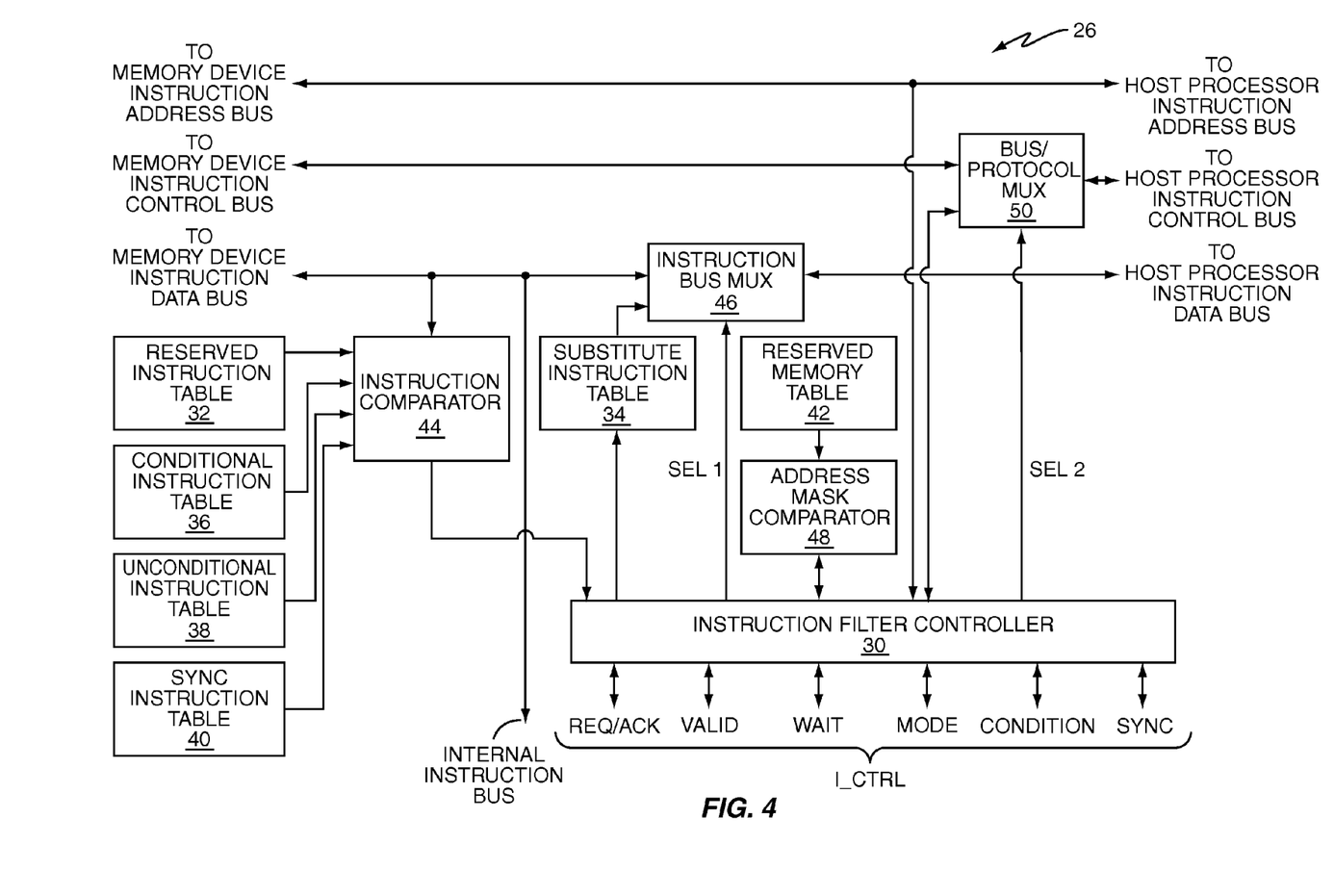
FIG. 4 is a block diagram of one embodiment of an instruction filter included in or associated with an application-specific component management unit.

FIG. 4 illustrates an exemplary embodiment of the instruction filter 26 included in or associated with the ASC management unit 18. The instruction filter 26 includes a controller 30 for directing actions of the instruction filter 26 based on the flow of instructions in the system 10 and signals (I_CTRL) received from the central controller 24. The instruction filter 26 also includes several tables 32-42 that store information used to identify certain instructions retrieved from the memory device 14 that signify particular events to the instruction filter 26. As such, particular instructions may be inserted into code stored in the memory device 14 to serve as flags to the instruction filter 26. When instructions are read from the memory device 14 at the request of the host processor 12, a comparator 44 included in the instruction filter 26 determines whether a received instruction matches any of the information stored in the tables 32-42. In the event of a match, the instruction filter 26 takes a corresponding action.

A first table 32 stores reserved host processor instructions that signal the beginning and end of code targeted for execution by the application-specific component 16. The instruction filter 26 accesses the first table 32 when it monitors received instructions. Received instructions are compared to the reserved instructions stored in the first table 32 by the comparator 44. In the event of a match, either the beginning or end of code targeted for execution by the application-specific component 16 has been detected by the instruction filter 26. In response, the instruction filter 26 takes an appropriate action.

By using reserved host processor instructions to signal the beginning and end of application-specific code, operation of the host processor 12 and the application-specific component 16 may be integrated. That is, incompatible code sequences may be integrated into a single software application, e.g., code compatible with the instruction set architecture of the host processor 12 and code compatible with the architecture of the application-specific device 16. Since code targeted for execution by the application-specific component 16 is not decoded or otherwise processed by the host processor 12 and vice-versa, application software may comprise various sequences of code uniquely tailored to different architectures. Only a limited number of reserved host processor instructions are needed to identify code sequences to be executed by the application-specific component 16, e.g., one instruction to indicate the beginning of code and another to signal the end. Alternatively, non-reserved instructions or a combination of reserved and non-reserved instructions may be used to identify code sequences to be executed by the application-specific component 16.

When the beginning of a code sequence is detected, the instruction filter 26 directs the received instructions to the central controller 24 for routing to the application-specific component 16. In place of the received instructions, the instruction filter 26 directs instructions to the host processor 12 configured to maintain instruction execution flow in the processor 12. In one embodiment, the controller 30 causes a host processor instruction bus multiplexer 46 to pass instructions stored in a second table 34 to the host processor 12 in place of instructions received from the memory device 14. The instructions provided to the host processor 12 maintain instruction execution flow in the host processor 12 without altering it.

When the end of the code sequence is detected, the instruction filter 26 re-routes the instruction flow back to the host processor 12. Particularly, the instruction filter controller 30 directs the host processor instruction bus multiplexer 46 to pass instructions received from the memory device 14 to the host processor 12 for execution. As such, the reserved instructions stored in the first table 32 identify when code received from the memory device 14 is to be routed to the application-specific component 16 for execution.

Third and fourth tables 36, 38 store information identifying instructions to be executed by the host processor 12, but which are embedded in code targeted for the application-specific component 16. That is, certain instructions in a sequence of code targeted for execution by the application-specific component 16 may be instructions targeted for execution by the host processor 12 instead. This allows the host processor 12 to execute certain instructions whose functionality is not supported by the application-specific component 16. For example, the application-specific component 16 may not support functions such as branches, jumps, data reads, data writes, etc. Consequently, the application-specific component 16 relies on the host processor 12 to execute these instructions. Because these instructions are embedded in code being routed to the application-specific component 16, the third and fourth tables 36, 38 provide a mechanism for identifying them. Once identified, the instruction filter 26 may direct them to the host processor 12 for execution instead of the application-specific component 16.

Figure 5:
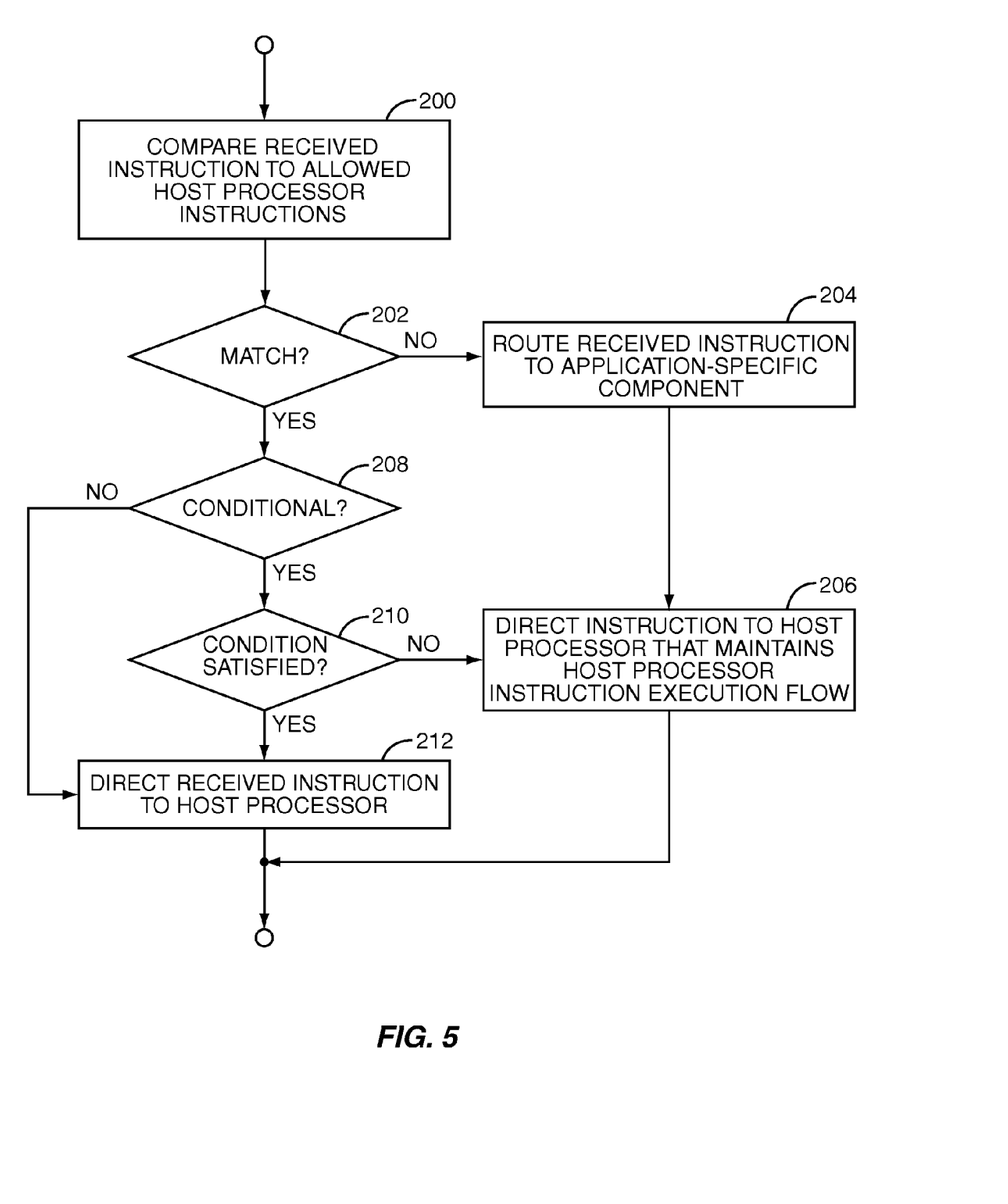
FIG. 5 illustrates one embodiment of processing logic for monitoring instructions retrieved from memory using the memory access capabilities of a host processor.

FIG. 5 illustrates one embodiment of program logic for directing an identified host processor instruction to the processor 12 while instructions are being routed to the application-specific component 16 for execution. A received instruction is compared to allowed host processor instructions, e.g., by comparing the received instruction with those stored in the third and fourth tables 36, 38 (Step 200). The instruction comparator 44 determines whether a match exists (Step 202). If no match exists, the received instruction is not slated for execution by the host processor 12. Accordingly, the instruction is directed to the application-specific component 16 as part of the instruction flow being routed to the component 16 (Step 204). In addition, the instruction filter 26 directs an instruction to the host processor 12 in place of the received instruction for maintaining instruction execution flow in the host processor 12 (Step 206).

If the comparator 44 detects a match, the instruction filter controller 30 determines whether the instruction is conditional or not (Step 208). For example, the received instruction may be a conditional branch instruction. If the instruction is conditional, the instruction filter controller 30 determines whether the condition has been satisfied (Step 210). In one embodiment, the application-specific component 16 resolves the condition and provides an indication to the ASC management unit 18 via the main controller 24, e.g., by causing a flag bit to be set. In another embodiment, the host processor 12 resolves the condition. Regardless, the main controller 24 indicates to the instruction filter controller 30 via a signal (CONDITION) whether the condition has been satisfied. If the condition has not been satisfied, the instruction filter 26 directs an instruction to the host processor 12 for maintaining instruction execution flow, but does not direct the identified conditional instruction to the host processor 12 (Step 206). If the condition is satisfied, or if the identified instruction is not conditional, the instruction filter 26 directs the received instruction to the host processor 12 for execution (Step 212). By identifying conditional instructions, the application-specific component 16, via the ASC management unit 18, is able to implement certain conditional actions such as branching and data movements using the host processor 12.

Returning to FIG. 4, the instruction filter 26 includes a fifth table 40 that stores instructions used to synchronize operation between the host processor 12 and the application-specific component 16. As such, synchronization instructions periodically inserted in code retrieved from the memory device are detectable. Alternatively, the actual flow of instructions and subsequent execution provides synchronization.

The tables 32-42 may be implemented as physically separate tables as shown, a single table or any combination in between. Additional instructions may be included in the tables 32-42 or in a separate table (not shown) for providing additional flagging capability. In one embodiment, instructions that signal different operating modes of the application-specific component 16 may be included in a table. For example, instructions that signal a low power or reset mode may be stored. In the event that the instruction filter 26 detects one of these instructions, an appropriate action is taken to alter the operating mode of the application-specific component 16.

The instruction filter 26 further includes circuitry for managing the flow of instructions between the memory device 14, the host processor 12 and the application-specific component 16. In one embodiment, the instruction filter 26 has a sixth table 42 for storing information that identifies reserved memory regions, e.g., memory addresses associated with reserved regions in the memory device 14. When the host processor 12 makes a request for instructions, an address comparator 48 determines whether the address associated with the host processor's 12 request matches an address stored in the sixth table 42. In the event of a match, the host processor 12 has requested instruction data from a reserved memory region in the memory device 14. The instruction filter 26 maintains normal flow of instructions between the host processor 12 and the memory device 14 when a reserved memory region is detected. Normal instruction flow is maintained even if application-specific code is detected. As such, certain regions in the memory device 14 may be excluded from the application-specific component 16.

In another embodiment, the sixth table 42 may alternatively or additionally store memory addresses used by the instruction filter controller 30 to identify the start and end of code targeted for execution by the application-specific component 16. As such, when the host processor 12 requests instructions from flagged regions in the memory device 14, the instruction filter 26 is able to determine that code targeted for the application-specific component 16 is to be retrieved from the memory device 14. According to this embodiment, the instruction filter 26 monitors memory addresses issued by the host processor 12 to identify application-specific code instead of or in addition to looking for reserved host processor instructions.

The instruction filter 26 may also include a bus protocol multiplexer 50. Different bus control signals may be needed depending on how the instruction filter 26 routes instructions. For example, the memory device 14, the host processor 12 and the application-specific component 16 may each utilize a different bus protocol, each protocol using different control signaling. The bus protocol multiplexer 50 enables the instruction filter 26 to select the correct control signaling based on the current flow of instructions. That is, the instruction filter controller 30 selects the appropriate bus control signals based on which device the instruction filter 26 is communicating with. This enables the ASC management unit 18 to support different bus protocols.

Various control signals flowing between the instruction filter controller 30 and the main controller 24 determine the operating state of the ASC management unit 18. In addition to the ones previously described, instruction request and acknowledgement (REQ/ACK) signals enable the main controller 24 to moderate speed of the ASC management unit 18. For example, request and acknowledgement signaling between the ASC management unit 18 and the application-specific component 16 may be hastened or delayed depending on the desired operating speed. A valid signal (VALID) indicates the validity of received instructions. Synchronization signals (SYNC) maintain synchronization within the ASC management unit 18. Mode control signals (MODE) indicate operating mode of the application-specific component 16. For example, if the instruction filter 26 detects an instruction that signals a mode change, the instruction filter 26 indicates this to the central controller 24. The central controller 24 then adjusts the operating mode of the application-specific component 16 accordingly.

In addition, wait state signals (WAIT) may be used by the central controller 24 to delay either the host processor 12 or the application-specific component 16, e.g., by issuing idle instructions. In one embodiment, a memory such as a cache (not shown) included in or associated with the ASC management unit 18 comprises code targeted for execution by the application-specific component 16. In the event the instruction filter 26 detects an address or host processor instruction signaling that the code is to be executed, the cache is accessed and the code is directed to the application-specific component 16. The code retrieved from the cache is directed to the application-specific component 16 in place of the instructions received from the memory device 14.

According to this embodiment, the host processor 12 may be stalled while this code is being executed by the application-specific component 16 since the host processor 12 memory access capabilities are not needed to retrieve this code. As such, the central controller 24 may activate a wait state signal to indicate that instruction execution by the host processor 12 is to be stalled until the code retrieved from the cache has been executed. In response, the instruction filter 26 generates one or more signals that halt the host processor 12 instruction bus. Alternatively, the instruction filter 26 directs a sequence of instructions to the host processor 12 that stall instruction execution in the processor 12. Regardless, after the code is executed, instruction flow to the application-specific component 16 from the memory device 14 is resumed unless otherwise indicated. As such, the wait state signal is deactivated by the central controller 24. In response, the instruction filter 26 resumes sending instructions to the host processor 12 designed to maintain host processor instruction execution flow while instructions received from the memory device 14 are routed to the application-specific component 16. In one embodiment, the cache is populated by storing a sequence of application-specific instructions received from the memory device 14. A sequence of code locally stored in the cache may be identified by a tag such as a particular detected address or instruction.

Figure 6:
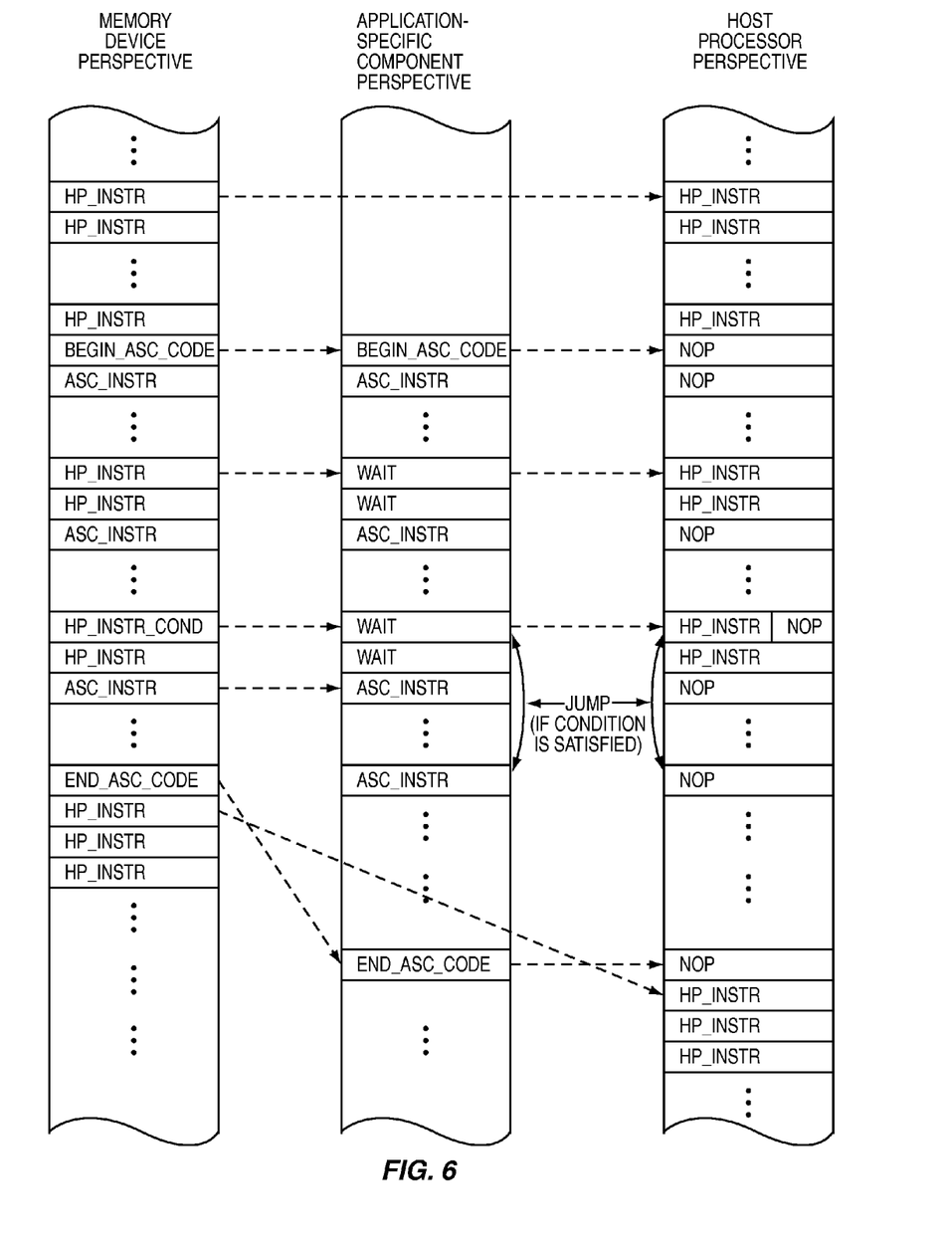
FIG. 6 is a diagram illustrating a non-limiting example of how a flow of instructions is routed to an application-specific component using the memory access capabilities of a host processor.

FIG. 6 illustrates a non-limiting example of how instructions retrieved from the memory device 14 flow within the system 10. Three perspectives are shown: from the memory device 14, the host processor 12 and the application-specific component 16. The instruction filter 26 monitors a flow of instructions as they are being retrieved from the memory device 14 at the request of the host processor 12. The instruction filter 26 routes the flow of instructions to the host processor 12 so long as the filter 26 does not detect the beginning of code targeted for execution by the application-specific component 16. In FIG. 6, the instruction filter 26 passes host processor instructions (HP_INSTR) to the host processor 12 until it detects the beginning of application-specific code (BEGIN_ASC_CODE), e.g., by detecting a reserved host processor instruction or a particular memory address. In response to detecting the code, the instruction filter 26 routes the instruction flow to the application-specific component 16. In parallel, the instruction filter 26 directs instructions (NOP) to the host processor 12 that maintain instruction execution flow without disturbing it, e.g., no-op instructions or instructions that move data between registers.

The application-specific component 16 executes the instructions routed to it (ASC_INSTR). The instruction flow routing continues until the end of the code is detected or unless the instruction filter 26 detects an instruction embedded in the code targeted for execution by the host processor 12 (HP_INSTR). In the event an embedded host processor instruction is detected, the instruction is directed to the host processor 12 for execution and the application-specific component 16 is idled if necessary (WAIT). In the event that a conditional instruction is embedded in the code (HP_INSTR_COND), the condition is resolved. If the instruction is to be executed, the instruction is directed to the host processor 12 for execution. Otherwise, an instruction for maintaining instruction execution flow is directed to the host processor 12. In the present example, the conditional host processor instruction is a conditional branch. As such, the application-specific component 16, via the ASC management unit 18, conditionally uses the host processor 12 to cause a break in instruction execution flow. Routing of instructions to the application-specific component 16 continues until the end of the code is detected (END_ASC_CODE). After the end of the code is detected, the instruction filter 26 re-routes the flow of instructions back to the host processor 12 for execution.

In addition to routing instructions retrieved from the memory device 14, the ASC management unit 18 also controls routing of data within the system 10. Particularly, the data filter 28 included in or associated with the ASC management unit 18 controls data routing in response to host processor data bus operations. The data filter 28 enables normal data flow between the host processor 12 and the memory device 14 when the application-specific component 16 is not receiving instructions. However, when the instruction filter 26 is routing code to the application-specific component 16, the data filter 28 may alter the flow of data. In one embodiment, the instruction filter 26 detects data request instructions such as reads and writes embedded in code received from the memory device 14. When a data request instruction is detected, the central controller 24 re-configures the data filter 28 based on the state of the application-specific component 16 or other variables. As such, when the host processor 12 subsequently initiates a corresponding request on its data bus, the data filter 28 is able to re-route received data to the appropriate device.

According to one embodiment, the data filter 28 directs data received from the memory device 14 to the application-specific component 16 in response to a read request issued by the host processor 12. In another embodiment, the data filter 28 directs data received from the application-specific component 16 to the host processor 12 in response to a read request issued by the host processor 12. In yet another embodiment, the data filter 28 directs data received from the application-specific component 16 to the memory device 14 in response to a write request issued by the host processor 12. In still another embodiment, the data filter 28 directs data received from the host processor 12 to the application-specific component 16 in response to a write request issued by the host processor 12.

Regardless, the ASC management unit 18 utilizes the memory management capabilities of the host processor 12 to initiate data flows. In one embodiment, the data filter 28 routes data based on a particular instruction detected in the flow of instructions received from the memory device 14 or based on the address associated with a data request issued by the host processor 12. That is, an instruction retrieved from the memory device 14 may indicate how data is to be routed by the data filter 28. Alternatively, the memory address associated with a read or write request issued by the host processor 12 may indicate how data is to be routed. In another embodiment, the application-specific component 16 indicates how data is to be routed. Regardless, the data filter 28 may route data in various ways while the application-specific component 16 is executing code. As such, the ASC management unit 18 utilizes the memory access capabilities of the host processor 12 to both retrieve code targeted for execution by the application-specific component 16 and to facilitate the movement of data within the system 10.

Figure 7:
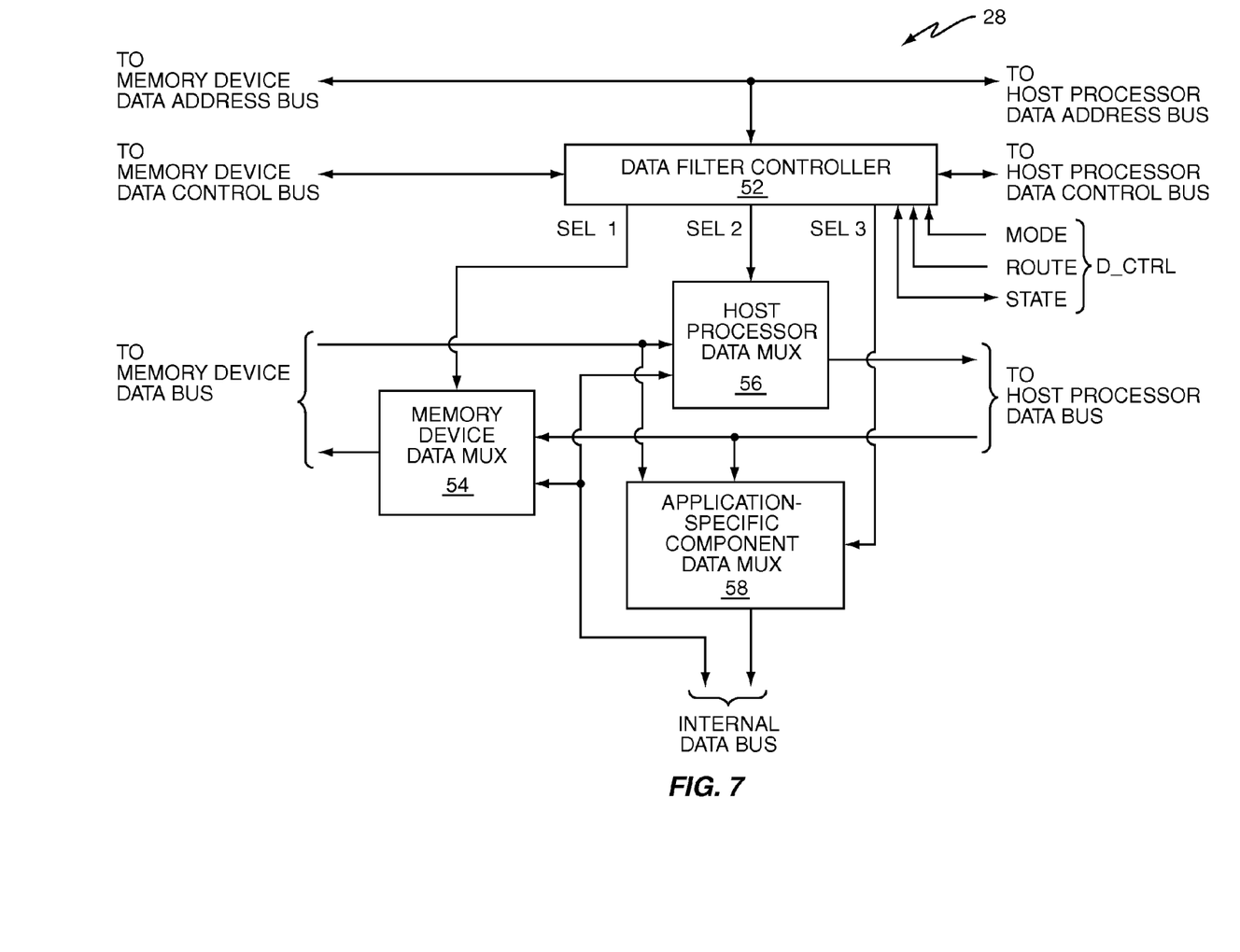
FIG. 7 is a block diagram of one embodiment of a data filter included in or associated with an application-specific component management unit.

FIG. 7 illustrates one embodiment of the data filter 28. A data filter controller 52 directs actions of the data filter 28 based on signals (D_CTRL) received from the central controller 24 and data bus activity. Data routing signals (ROUTE) received from the central controller 24 determine the input and output data routing configuration of the data filter 28. State control signals (STATE) passing between the data filter controller 52 and the central controller 24 determine the type of data operation implemented by the data filter 28, e.g., read, write, wait, etc. A mode control signal (MODE) received from the central controller 24 determines what mode the data filter 28 is in, e.g., sleep, reset, normal, etc.

Based on the control signals, the data filter controller 52 determines how data received by the ASC management unit 18 is routed. The data filter 28 enables normal data flow between the host processor 12 and the memory device 14 when the application-specific component 16 is not receiving instructions. However, when the instruction filter 26 is routing code to the application-specific component 16, the data filter 28 may alter the flow of data as previously described. Particularly, the data filter 28 includes three multiplexers 54-58 for directing data flow between the devices interfaced to the ASC management unit 18: the memory device 14, the host processor 12 and the application-specific component 16.

The first multiplexer 54 controls the flow of data being written to the memory device 12 in response to a data write request issued by the host processor 12. The data filter controller 52, via a first signal (SEL1), directs data received from either the application-specific component 16 or the host processor 12 to the memory device 14 using the first multiplexer 54. The second multiplexer 56 controls the flow of data being transmitted to the host processor 12 in response to a data read request issued by the processor 12. The data filter controller 52, via a second signal (SEL2), directs data received from either the memory device 12 or the application-specific component 16 to the host processor 12 using the second multiplexer 56. The third multiplexer 58 controls the flow of data being transmitted to the application-specific component 16 in response to either a data read or write request issued by the host processor 12. The data filter controller 52, via a third signal (SEL3), directs data received from either the memory device 14 or the host processor 12 to the application-specific component 16 using the third multiplexer 58. Optionally, the ASC management unit 18 may transfer received data to multiple devices in parallel.

The ASC management unit 18 may be used to interface a host processor to any application-specific component having direct access to memory. Such an arrangement alleviates the need to tightly couple or otherwise make an application-specific component dependent upon the host processor architecture. As such, the ASC management unit 18 allows architecturally independent application-specific components to be loosely coupled to a host processor without their own memory management circuitry. Instead, the ASC management unit 18 leverages the memory management capabilities of a host processor to facilitate the movement of instructions and data to and from an application-specific component.

Figure 8:
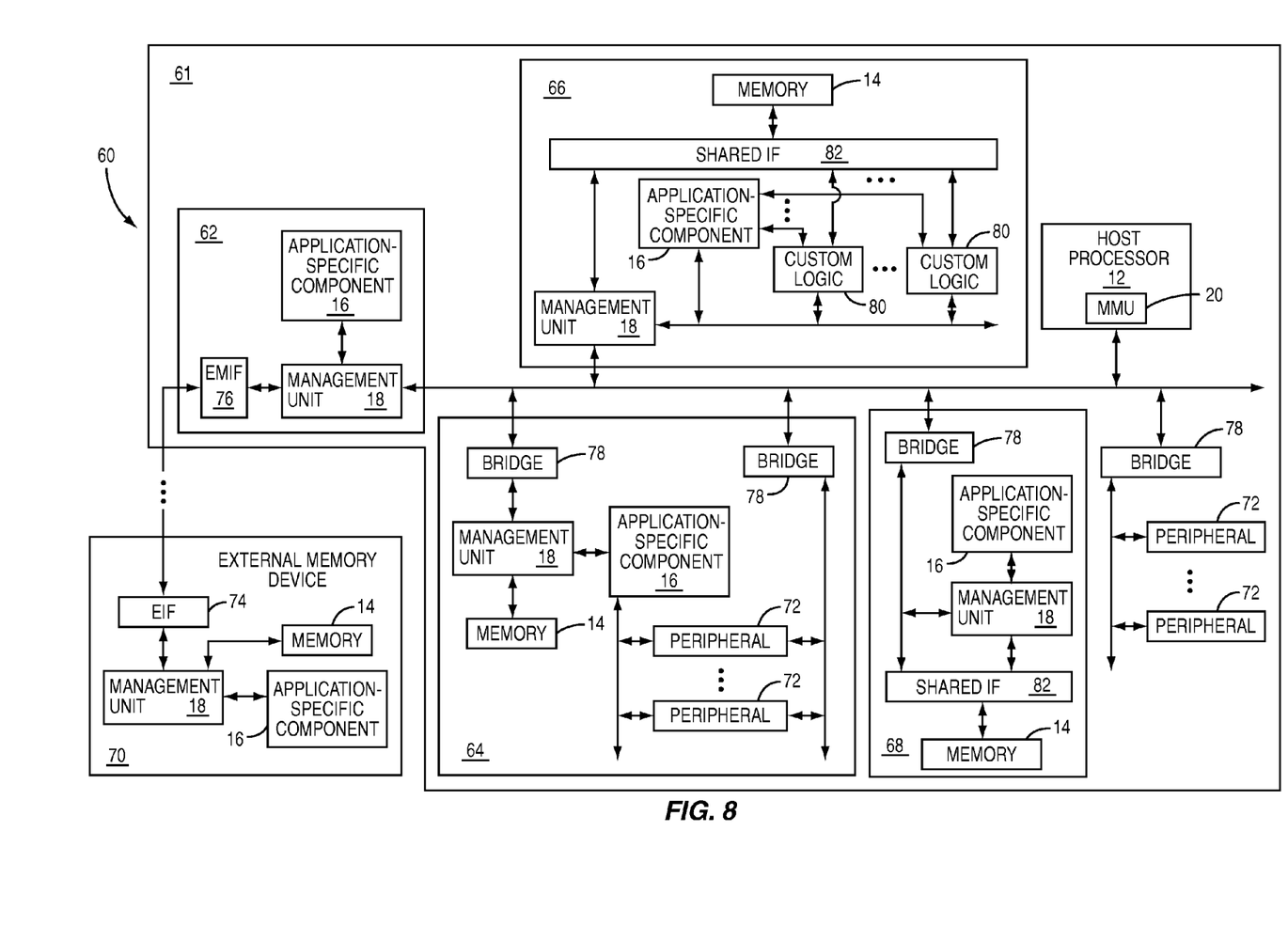
FIG. 8 is a block diagram of one embodiment of an electronic system that uses the memory access capabilities of a host processor to route information to application-specific components included in or associated with the electronic system.

FIG. 8 illustrates one embodiment of a system 60, e.g., a System-On-Chip (SOC). The system 60 has various internal devices 62-68 and interfaces with an external device 70. Each device 62-70 has direct access to a memory device 14 and also has an application-specific component 16 for performing processing tasks associated with the respective memory devices 14. An ASC management unit 18 is included in or associated with each device 62-70 for controlling the flow of data and instructions to and from the respective application-specific components 16. The devices 62-70 implement specific functions supported by their respective application-specific components 16, e.g., controlling host processor 12 interaction with peripheral devices 72, managing host processor 12 interaction with the external device 70, enabling one or more processing functions supported by the host processor 12 such as arithmetic functions, etc.

The external device 70 comprises memory 14 such as FLASH memory for storing data. The external device 70 has an External Interface (EIF) 74 for communicating with the system 60. The device 70 also has an ASC management unit 18 and an application-specific component 16. The application-specific component 16 performs various functions associated with data read from or written to the memory 14, e.g., error detection, error correction, encryption, decryption, etc.

One device 62 included in the system 60 implements interfacing tasks with the external device 70. The device 62 has an External Memory Interface (EMIF) 76 for communicating with the external device 70. Other devices 64-66 included in the system 60 are coupled to the host processor 12 bus via a bridge circuit 78. Each of these devices 64-66 also has an ASC management unit 18 and a directly accessible memory device 14. The devices 62-70 may have other circuitry such as custom logic 80 and/or peripherals 72 requiring access to respective memories 14. A shared interface 82 may be included to accommodate such circuitry. Other devices such as peripherals 72 may communicate with the host processor 12 via a bridge circuit 78 without the assistance of an ASC management unit 18.

Regardless of the particular functions supported by the devices 62-70 and the circuitry included to implement this functionality, the ASC management unit 18 utilizes the memory management capabilities of the host processor 12 to route instructions and data to and from the devices 62-70 included in or associated with the system 60. Unlike conventional systems, the application-specific components 16 associated with these devices 62-70 do not require circuitry for managing access to their respective memories 14. In addition, the ASC management unit 18 allows the application-specific components 16 to be loosely coupled to the host processor 12, thus obviating the need for direct control by the host processor 12. As such, processing tasks may be offloaded from the host processor 12 to the application-specific components 16 without overburdening the host processor 12. The components 16 may execute code that is incompatible with the instruction set architecture of the host processor 12, yet the code may be integrated with code configured for execution by the host processor 12, thus allowing fully integrated software applications.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of managing information flow to an application-specific component using memory access capability of a host processor, comprising:

monitoring a flow of instructions requested by the host processor from a memory device;

routing the flow of instructions to the application-specific component in response to identifying code embedded in the flow of instructions targeted for execution by the application-specific component;

while the flow of instructions is being routed to the application-specific component, directing a sequence of instructions to the host processor configured to maintain instruction execution flow in the host processor; and
re-routing the flow of instructions to the host processor in response to identifying an end of the code.

2. The method of claim 1, wherein identifying code embedded in the flow of instructions targeted for execution by the application-specific component comprises identifying a first reserved instruction included in the flow of instructions.

3. The method of claim 2, wherein identifying an end of the code comprises identifying a second reserved instruction included in the flow of instructions.

4. The method of claim 3, wherein routing the flow of instructions to the application-specific component in response to identifying code embedded in the flow of instructions targeted for execution by the application-specific component comprises routing instructions received between the first and second reserved instructions in the flow of instructions to the application-specific component.

5. The method of claim 1, wherein identifying code embedded in the flow of instructions targeted for execution by the application-specific component comprises identifying an instruction address corresponding to a first predefined memory address value.

6. The method of claim 5, wherein identifying an end of the code comprises identifying an instruction address corresponding to a second predefined memory address value.

7. The method of claim 6, wherein routing the flow of instructions to the application-specific component in response to identifying code embedded in the flow of instructions targeted for execution by the application-specific component comprises routing instructions in the flow of instructions having a memory address between the first and second predefined memory address values to the application-specific component.

8. The method of claim 1, wherein the identified code comprises instructions incompatible with an instruction set architecture associated with the host processor.

9. The method of claim 1, further comprising:
while the flow of instructions is being routed to the application-specific component, identifying one or more instructions included in the flow of instructions targeted for execution by the host processor; and
routing the identified instructions to the host processor for execution in place of the sequence of instructions configured to maintain instruction execution flow in the host processor.

10. The method of claim 9, wherein identifying one or more instructions included in the flow of instructions targeted for execution by the host processor while the flow of instructions is being routed to the application-specific component comprises identifying individual ones of the instructions included in the flow of instructions that match one of a plurality of predefined instruction values.

11. The method of claim 9, wherein identifying one or more instructions included in the flow of instructions targeted for execution by the host processor while the flow of instructions is being routed to the application-specific component comprises identifying one or more conditional instructions included in the flow of instructions that match one of a plurality of predefined instruction values and that have a resolved condition.

12. The method of claim 1, further comprising altering an operating state of the application-specific component in response to identifying one or more mode control commands associated with the application-specific component embedded in the flow of instructions.

13. The method of claim 1, further comprising directing locally stored code to the application-specific component in place of the flow of instructions in response to identifying a command embedded in the flow of instructions.

14. The method of claim 13, further comprising halting the instruction execution flow in the host processor until the application-specific component completes execution of the locally stored code.

15. The method of claim 14, wherein halting the instruction execution flow in the host processor until the application-specific component completes execution of the locally stored code comprises directing one or more idle commands to the host processor in place of the sequence of instructions configured to maintain instruction execution flow in the host processor.

16. The method of claim 1, further comprising routing a portion of the flow of instructions received from a restricted region in the memory device to the host processor in place of the sequence of instructions configured to maintain instruction execution flow in the host processor.

17. The method of claim 1, further comprising maintaining synchronization between the application-specific component, the host processor and the memory device based on the flow of instructions.

18. The method of claim 1, further comprising locally storing a sequence of application-specific instructions in response to identifying a tag embedded in the flow of instructions.

19. The method of claim 18, further comprising subsequently directing the locally stored sequence of application-specific instructions to the application-specific component in place of the flow of instructions in response to identifying a different tag embedded in the flow of instructions.

20. The method of claim 19, further comprising halting the instruction execution flow in the host processor until the application-specific component completes execution of the locally stored sequence of application-specific instructions.

21. The method of claim 1, further comprising:
recognizing a data request issued by the host processor while the flow of instructions is being routed to the application-specific component; and
routing data received in response to the data request based on at least one of a memory address associated with the data request and one or more instructions included in the flow of instructions.

22. The method of claim 21, wherein the data request issued by the host processor is a read request.

23. The method of claim 22, wherein routing data received in response to the data request based on at least one of a memory address associated with the data request and one or more instructions included in the flow of instructions comprises directing data received from the memory device to the application-specific component in response to the read request.

24. The method of claim 23, further comprising directing the data received from the memory device to the host processor in addition to the application-specific component.

25. The method of claim 22, wherein routing data received in response to the data request based on at least one of a memory address associated with the data request and one or more instructions included in the flow of instructions comprises directing data received from the application-specific component to the host processor in response to the read request.

26. The method of claim 21, wherein the data request issued by the host processor is a write request.

27. The method of claim 26, wherein routing data received in response to the data request based on at least one of a memory address associated with the data request and one or more instructions included in the flow of instructions comprises directing data received from the application-specific component to the memory device in response to the write request.

28. The method of claim 26, wherein routing data received in response to the data request based on at least one of a memory address associated with the data request and one or more instructions included in the flow of instructions comprises directing data received from the host processor to the application-specific component in response to the write request.

29. The method of claim 28, further comprising directing the data received from the host processor to the memory device in addition to the application-specific component.

30. An apparatus for managing information flow to an application-specific component using memory access capability of a host processor, comprising:

an instruction filter configured to monitor a flow of instructions requested by the host processor from a memory device, to identify code embedded in the flow of instructions targeted for execution by the application-specific component, to direct a sequence of instructions to the host processor while the flow of instructions is being routed to the application-specific component, the sequence of instructions configured to maintain instruction execution flow in the host processor, to identify an end of the code, and to re-route the flow of instructions to the host processor in response to identifying the end of the code; and a control unit configured to route the flow of instructions to the application-specific component in response to the instruction filter identifying the code.

31. The apparatus of claim 30, wherein the instruction unit is configured to identify code embedded in the flow of instructions targeted for execution by the application-specific component by identifying a first reserved instruction included in the flow of instructions.

32. The apparatus of claim 31, wherein the instruction unit is configured to identify an end of the code by identifying a second reserved instruction included in the flow of instructions.

33. The apparatus of claim 32, wherein the control unit is configured to route the flow of instructions to the application-specific component in response to identifying the code by routing instructions received between the first and second reserved instructions in the flow of instructions to the application-specific component.

34. The apparatus of claim 31, wherein the instruction unit is configured to identify code embedded in the flow of instructions targeted for execution by the application-specific component by identifying an instruction address corresponding to a first predefined memory address value.

35. The apparatus of claim 34, wherein the instruction unit is configured to identify an end of the code by identifying an instruction address corresponding to a second predefined memory address value.

36. The apparatus of claim 35, wherein the control unit is configured to route the flow of instructions to the application-specific component in response to identifying the code by routing instructions in the flow of instructions having a memory address between the first and second predefined memory address values to the application-specific component.

37. The apparatus of claim 30, wherein the identified code comprises instructions incompatible with an instruction set architecture associated with the host processor.

38. The apparatus of claim 30, wherein the instruction unit is further configured to identify one or more instructions included in the flow of instructions targeted for execution by the host processor while the control unit routes the flow of instructions to the application-specific component and to route the identified instructions to the host processor for execution in place of the sequence of instructions configured to maintain instruction execution flow in the host processor.

39. The apparatus of claim 38, wherein the instruction unit is configured to identify one or more instructions included in the flow of instructions targeted for execution by the host processor while the control unit routes the flow of instructions to the application-specific component by identifying individual ones of the instructions included in the flow of instructions that match one of a plurality of predefined instruction values.

40. The apparatus of claim 38, wherein the instruction unit is configured to identify one or more instructions included in the flow of instructions targeted for execution by the host processor while the control unit routes the flow of instructions to the application-specific component by identifying one or more conditional instructions included in the flow of instructions that match one of a plurality of predefined instruction values having an instruction execution indication.

41. The apparatus of claim 30, wherein the control unit is further configured to alter an operating state of the application-specific component in response to the instruction filter identifying one or more mode control commands associated with the application-specific component embedded in the flow of instructions.

42. The apparatus of claim 30, further comprising a local memory device configured to store a sequence of code configured for execution by the application-specific component.

43. The apparatus of claim 42, wherein the control unit is further configured to direct the sequence of code to the application-specific component in place of the flow of instructions in response to the instruction filter identifying a command embedded in the flow of instructions.

44. The apparatus of claim 43, wherein the instruction unit is further configured to direct the host processor to halt the instruction execution flow in the host processor until the application-specific component completes execution of the sequence of code.

45. The apparatus of claim 44, wherein the instruction unit is configured to direct the host processor to halt the instruction execution flow in the host processor until the application-specific component completes execution of the sequence of code by directing one or more idle commands to the host processor in place of the sequence of instructions configured to maintain instruction execution flow in the host processor.

46. The apparatus of claim 30, wherein the instruction unit is further configured to route a portion of the flow of instructions received from a restricted region in the memory device to the host processor in place of the sequence of instructions configured to maintain instruction execution flow in the host processor.

47. The apparatus of claim 30, wherein the control unit is further configured to maintain synchronization between the application-specific component, the host processor and the memory device based on the flow of instructions.

48. The apparatus of claim 30, further comprising a local memory device configured to store a sequence of application-specific instructions in response to the instruction filter identifying a tag embedded in the flow of instructions.

49. The apparatus of claim 48, wherein the control unit is further configured to subsequently direct the sequence of application-specific instructions stored in the local memory device to the application-specific component in place of the flow of instructions in response to the instruction filter identifying a different tag embedded in the flow of instructions.

50. The apparatus of claim 49, wherein the instruction filter is further configured to direct the host processor to halt the instruction execution flow in the host processor until the application-specific component completes execution of the locally stored sequence of application-specific instructions.

51. The apparatus of claim 30, wherein the instruction filter is further configured to recognize a data request issued by the host processor while the flow of instructions is being routed to the application-specific component.

52. The apparatus of claim 30, further comprising a data filter configured to route data received in response to the data request based on at least one of a memory address associated with the data request and one or more instructions included in the flow of instructions.

53. The apparatus of claim 52, wherein the data request issued by the host processor is a read request.

54. The apparatus of claim 53, wherein the data filter is configured to route data received in response to the data request based on at least one of a memory address associated with the data request and one or more instructions included in the flow of instructions by directing data received from the memory device to the application-specific component in response to the read request.

55. The apparatus of claim 54, wherein the data filter is further configured to direct the data received from the memory device to the host processor in addition to the application-specific component.

56. The apparatus of claim 53, wherein the data filter is configured to route data received in response to the data request based on at least one of a memory address associated with the data request and one or more instructions included in the flow of instructions by directing data received from the application-specific component to the host processor in response to the read request.

57. The apparatus of claim 52, wherein the data request issued by the host processor is a write request.

58. The apparatus of claim 57, wherein the data filter is configured to route data received in response to the data request based on at least one of a memory address associated with the data request and one or more instructions included in the flow of instructions by directing data received from the application-specific component to the memory device in response to the write request.

59. The apparatus of claim 57, wherein the data filter is configured to route data received in response to the data request based on at least one of a memory address associated with the data request and one or more instructions included in the flow of instructions by directing data received from the host processor to the application-specific component in response to the write request.

60. The apparatus of claim 59, wherein the data filter is further configured to direct the data received from the host processor to the memory device in addition to the application-specific component.

61. An electronic device, comprising:
an application-specific component loosely coupled to a host processor having memory access capability, the application-specific component configured to execute code stored in a memory device; and
a flow control component configured to direct the code to the application-specific component for execution using the memory access capability of the host processor.

62. The electronic device of claim 61, further comprising an external memory interface unit configured to provide an interface between the flow control component and the memory device, wherein the memory device is external to the electronic device.

63. The electronic device of claim 61, further comprising an external interface unit configured to provide an interface between the flow control component and the host processor, wherein the host processor is external to the electronic device.

64. The electronic device of claim 61, wherein the flow control component is configured to direct the code to the application-specific component for execution using the memory access capability of the host processor by monitoring a flow of instructions requested by the host processor from the memory device, routing the flow of instructions to the application-specific component in response to identifying the code embedded in the flow of instructions, directing a sequence of instructions to the host processor configured to maintain instruction execution flow in the host processor while the flow of instructions is being routed to the application-specific component, and re-routing the flow of instructions to the host processor in response to identifying an end of the code.

65. The electronic device of claim 64, wherein the flow control component is further configured to recognize a data request issued by the host processor while the flow of instructions is being routed to the application-specific component and to route data received in response to the data request based on at least one of a memory address associated with the data request and one or more instructions included in the flow of instructions.

66. The electronic device of claim 65, wherein the flow control component is configured to route data received in response to the data request based on at least one of a memory address associated with the data request and one or more instructions included in the flow of instructions by directing data received from the memory device to the application-specific component in response to a read request issued by the host processor.

67. The electronic device of claim 65, wherein the flow control component is configured to route data received in response to the data request based on at least one of a memory address associated with the data request and one or more instructions included in the flow of instructions by directing data received from the application-specific component to the host processor in response to a read request issued by the host processor.

68. The electronic device of claim 65, wherein the flow control component is configured to route data received in response to the data request based on at least one of a memory address associated with the data request and one or more instructions included in the flow of instructions by directing data received from the application-specific component to the memory device in response to a write request issued by the host processor.

69. The electronic device of claim 65, wherein the flow control component is configured to route data received in response to the data request based on at least one of a memory address associated with the data request and one or more instructions included in the flow of instructions by directing data received from the host processor to the application-specific component in response to a write request issued by the host processor.

70. The electronic device of claim 61, wherein the code directed to the application-specific component by the flow control component comprises instructions incompatible with an instruction set architecture associated with the host processor.

71. The electronic device of claim 61, wherein the code directed to the application-specific component by the flow control component is configured to at least one of encrypt data, decrypt data, correct data errors, implement a protocol for controlling host processor interaction with individual ones of peripheral devices, manage host processor interaction with a device external to the electronic device, and enable one or more processing functions supported by the host processor.

* * * * *